United States Patent
Escott et al.

(10) Patent No.: US 12,445,296 B2
(45) Date of Patent: Oct. 14, 2025

(54) AUTHENTICATION AND KEY MANAGEMENT FOR APPLICATIONS (AKMA) APPLICATION KEY ($K_{AF}$) REFRESH

(71) Applicant: QUALCOMM Incorporated, San Diego, CA (US)

(72) Inventors: Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 18/504,042

(22) Filed: Nov. 7, 2023

(65) Prior Publication Data

US 2024/0163110 A1   May 16, 2024

Related U.S. Application Data

(60) Provisional application No. 63/383,216, filed on Nov. 10, 2022.

(51) Int. Cl.
*H04L 9/32* (2006.01)
*H04L 9/08* (2006.01)
*H04L 9/14* (2006.01)

(52) U.S. Cl.
CPC .......... *H04L 9/3242* (2013.01); *H04L 9/0866* (2013.01); *H04L 9/0891* (2013.01); *H04L 9/14* (2013.01)

(58) Field of Classification Search
CPC ... H04L 9/3242; H04L 9/0866; H04L 9/0891; H04L 9/14
See application file for complete search history.

(56) References Cited

U.S. PATENT DOCUMENTS

2009/0111428 A1\* 4/2009 Blommaert ......... H04W 12/041
455/445
2020/0358788 A1\* 11/2020 Lee ....................... H04L 9/0866
(Continued)

FOREIGN PATENT DOCUMENTS

WO   2021167399 A1   8/2021
WO   2021196161 A1   10/2021
(Continued)

OTHER PUBLICATIONS

China Mobile: "Clean Up of TR 33.835", 3GPP TSG-SA Meeting #88, SP-200375, 3GPP TSG-SA3 Meeting #99e, S3-201143, 3rd Generation Partnership Project, Mobile Competence Centre, 650, Route Des Lucioles, F-06921 Sophia-Antipolis Cedex, France, vol. SA WG3, No. e-meeting, May 11, 2020-May 15, 2020, Jun. 12, 2020, 69 Pages, XP052432809.
(Continued)

*Primary Examiner* — J. Brant Murphy
(74) *Attorney, Agent, or Firm* — Polsinelli

(57) ABSTRACT

Disclosed are systems and techniques for wireless communications. For instance, a process may include generating an anchor key based on an authentication server function key; associating a count value with the anchor key; generating a temporary device identifier based on the authentication server function key; generating an enhanced key identifier based on the count value, wherein the enhanced key identifier includes a portion of the temporary device identifier, wherein the portion of the temporary device identifier is less in size than an entire temporary device identifier; and transmitting the enhanced key identifier to a remote application.

30 Claims, 11 Drawing Sheets

(56) References Cited

U.S. PATENT DOCUMENTS

| | | | |
|---|---|---|---|
| 2021/0124818 A1* | 4/2021 | Muthukumaran | H04L 9/0894 |
| 2022/0191043 A1* | 6/2022 | Ying | H04L 9/0869 |
| 2023/0068196 A1* | 3/2023 | Sasi | H04L 9/0836 |

FOREIGN PATENT DOCUMENTS

| | | |
|---|---|---|
| WO | 2023008929 A1 | 2/2023 |
| WO | 2023016451 A1 | 2/2023 |
| WO | 2023071885 A1 | 5/2023 |

OTHER PUBLICATIONS

International Search Report and Written Opinion—PCT/US2023/079143—ISA/EPO—Feb. 13, 2024.

OPPO: "New Solution: Security Procedure of KAF Refresh", 3GPP TSG-SA3 Meeting #107-e, S3-220900, 3rd Generation Partnership Project, Mobile Competence Centre, 650, Route Des Lucioles, F-06921 Sophia-Antipolis Cedex, France, vol. SA WG3, No. e-meeting, May 16, 2022-May 20, 2022, May 9, 2022, 3 Pages, XP052195225.

Qualcomm Incorporated: "pCR : AKMA Temporary UE Identifier", 3GPP TSG-SA3 Meeting #98Bis-e, S3-200770, 3rd Generation Partnership Project, Mobile Competence Centre, 650, Route Des Lucioles, F-06921 Sophia-Antipolis Cedex, France, vol. SA WG3, No. e-meeting, Apr. 14, 2020-Apr. 17, 2020, Apr. 3, 2020, 2 Pages, XP052470813.

Samsung: "AKMA and Application Key Derivation", 3GPP TSG-SA3 Meeting #98e, S3-200171, 3rd Generation Partnership Project, Mobile Competence Centre, 650, Route Des Lucioles, F-06921 Sophia-Antipolis Cedex, France, vol. SA WG3, No. e-meeting, Mar. 2, 2020-Mar. 6, 2020, Feb. 21, 2020, 5 Pages, XP052470991.

ZTE: "pCR to TS 33.535: Define the A-TID Format", 3GPP TSG-SA3 Meeting #99e, S3-200971, 3rd Generation Partnership Project, Mobile Competence Centre, 650, Route Des Lucioles, F-06921 Sophia-Antipolis Cedex, France, vol. SA WG3, No. e-meeting May 11, 2020-May 15, 2020, May 1, 2020, 2 Pages, XP052471458.

* cited by examiner

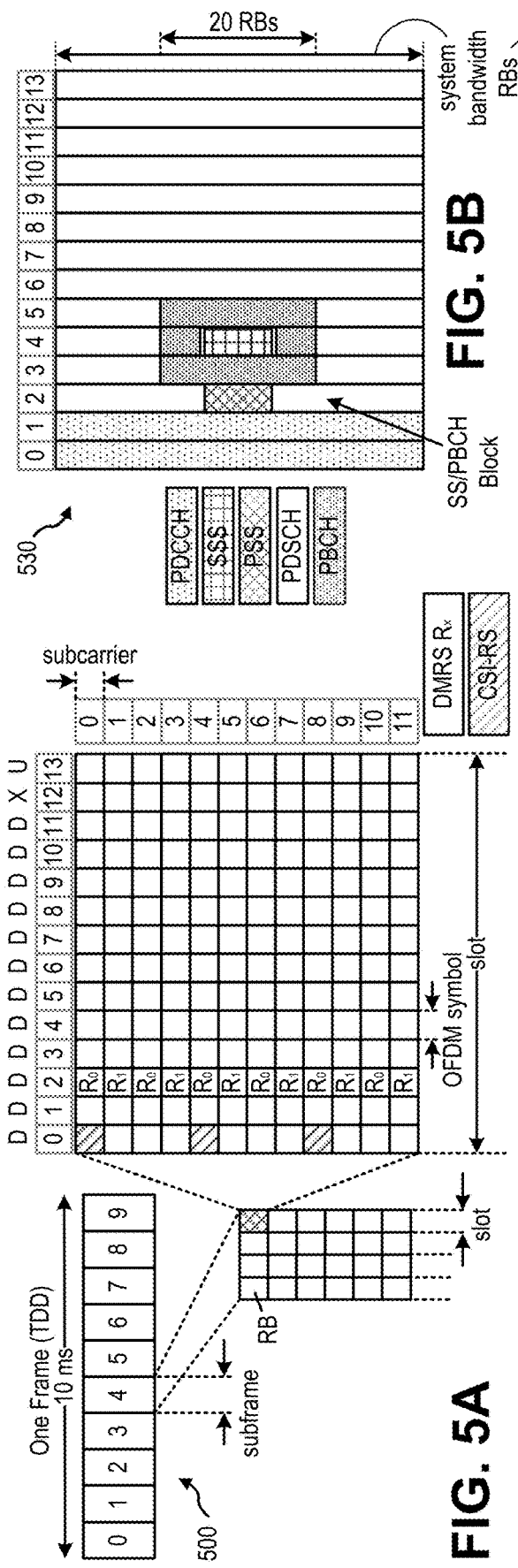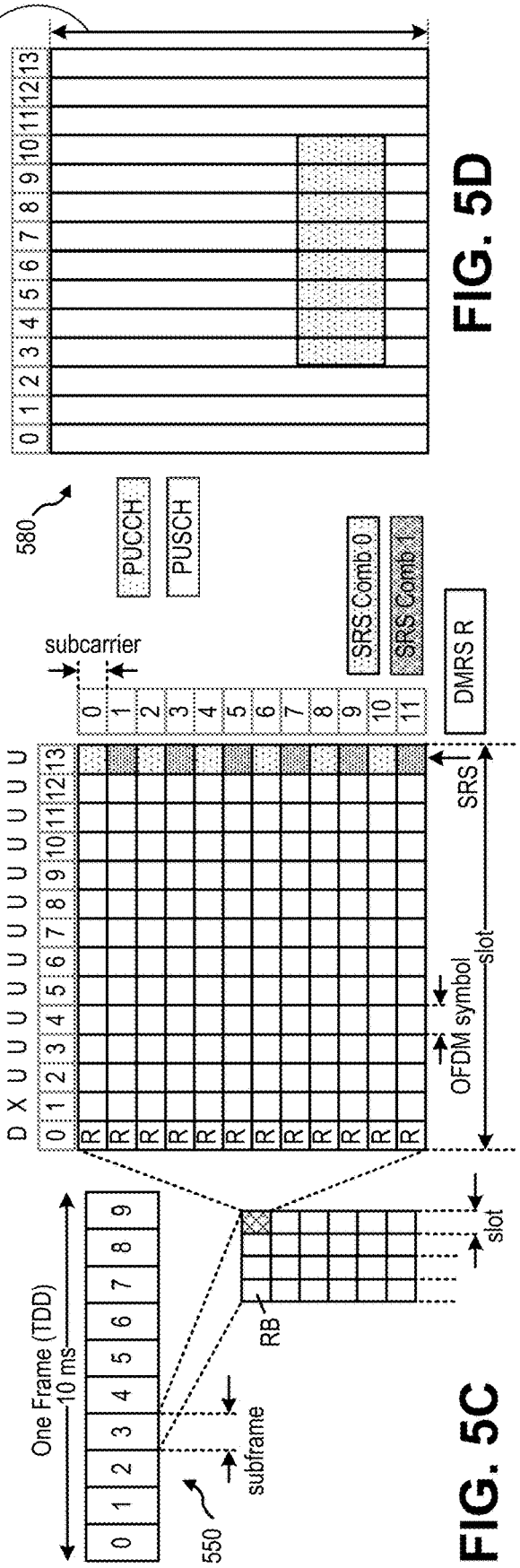
FIG. 5A  FIG. 5B  FIG. 5C  FIG. 5D

AUTHENTICATION AND KEY MANAGEMENT FOR APPLICATIONS (AKMA) APPLICATION KEY ($K_{AF}$) REFRESH

CROSS-REFERENCE TO RELATED APPLICATIONS

This application claims the benefit of U.S. Provisional Application No. 63/383,216, filed Nov. 10, 2022, which is hereby incorporated by reference, in their entirety and for all purposes.

FIELD

The present disclosure generally relates to wireless communications. For example, aspects of the present disclosure relate to systems and techniques for providing enhanced privacy by refreshing authentication and key management for applications (AKMA) application keys ($K_{AF}$).

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Although wireless communication systems have made great technological advancements over many years, challenges still exist. For example, AKMA authentication for a wireless device may provide an application key $K_{AF}$ that may be used by applications that interact with the network. However, the $K_{AF}$ remains fixed until a new primary authentication has been run. It may be useful to obtain a new $K_{AF}$ more often than provided for by primary authentication.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, an apparatus for wireless communications is provided that includes at least one memory and at least one processor (e.g., implemented in circuitry) coupled to the at least one memory. The at least one processor is configured to: generate an anchor key based on a key from an authentication server function; associate a count value with the anchor key; generate an enhanced key identifier based on the count value; and transmit the enhanced key identifier to a remote application.

In another example, an apparatus for wireless communications, comprising: at least one memory comprising instructions; and at least one processor coupled to the at least one memory and configured to: receive an anchor key and key identifier associated with a user device from an authentication server function; receive a first request for an application key from a remote application, the first request including a first key identifier; determine that the first key identifier is a first enhanced key identifier, wherein the first enhanced key identifier includes a count value; generate a first enhanced application key based on the count value associated with the first enhanced key identifier; and transmit the first enhanced application key and an indication that the user device is using an enhanced key identifier to the remote application.

As another example, an apparatus for wireless communications, comprising: at least one memory comprising instructions; and at least one processor coupled to the at least one memory and configured to: receive a first key identifier from a user device; transmit the first key identifier to an authentication server function; receive, from the authentication server function, a first enhanced application key and an indication that the user device is using an enhanced key identifier; transmit, to the user device, a response, the response including a request for an updated key identifier; receiving a second key identifier from the user device; transmit the second key identifier to an authentication server function; receive, from the authentication server function, a second enhanced application key; and communicate with the user device based on the second enhanced application key.

In another example, a method for wireless communications, comprising: generating an anchor key based on a key from an authentication server function; associating a count value with the anchor key; generating an enhanced key identifier based on the count value; and transmitting the enhanced key identifier to a remote application.

As another example, a method for wireless communications, comprising: receiving an anchor key and key identifier associated with a user device from an authentication server function; receiving a first request for an application key from a remote application, the first request including a first key identifier; determining that the first key identifier is a first enhanced key identifier, wherein the first enhanced key identifier includes a count value; generating a first enhanced application key based on the count value associated with the first enhanced key identifier; and transmitting the first enhanced application key and an indication that the user device is using an enhanced key identifier to the remote application.

In another example, a method for wireless communications, comprising: receiving a first key identifier from a user device; transmitting the first key identifier to an authentication server function; receiving, from the authentication server function, a first enhanced application key and an indication that the user device is using an enhanced key identifier; transmitting, to the user device, a response, the response including a request for an updated key identifier; receiving a second key identifier from the user device; transmitting the second key identifier to an authentication server function; receiving, from the authentication server function, a second enhanced application key; and communicating with the user device based on the second enhanced application key.

As another example, a non-transitory computer-readable medium having stored thereon instructions that, when executed by at least one processor, cause the at least one processor to: generate an anchor key based on a key from an authentication server function; associate a count value with the anchor key; generate an enhanced key identifier based on the count value; and transmit the enhanced key identifier to a remote application.

In another example, a non-transitory computer-readable medium having stored thereon instructions that, when executed by at least one processor, cause the at least one processor to: receive an anchor key and key identifier associated with a user device from an authentication server function; receive a first request for an application key from a remote application, the first request including a first key identifier; determine that the first key identifier is a first enhanced key identifier, wherein the first enhanced key identifier includes a count value; generate a first enhanced application key based on the count value associated with the first enhanced key identifier; and transmit the first enhanced application key and an indication that the user device is using an enhanced key identifier to the remote application.

As another example, a non-transitory computer-readable medium having stored thereon instructions that, when executed by at least one processor, cause the at least one processor to: at least one memory comprising instructions; and at least one processor coupled to the at least one memory and configured to: receive a first key identifier from a user device; transmit the first key identifier to an authentication server function; receive, from the authentication server function, a first enhanced application key and an indication that the user device is using an enhanced key identifier; transmit, to the user device, a response, the response including a request for an updated key identifier; receiving a second key identifier from the user device; transmit the second key identifier to an authentication server function; receive, from the authentication server function, a second enhanced application key; and communicate with the user device based on the second enhanced application key.

In another example, an apparatus for wireless communications, comprising: means for generating an anchor key based on a key from an authentication server function; means for associating a count value with the anchor key; means for generating an enhanced key identifier based on the count value; and means for transmitting the enhanced key identifier to a remote application.

As another example, an apparatus for wireless communications, comprising: means for receiving an anchor key and key identifier associated with a user device from an authentication server function; means for receiving a first request for an application key from a remote application, the first request including a first key identifier; means for determining that the first key identifier is a first enhanced key identifier, wherein the first enhanced key identifier includes a count value; means for generating a first enhanced application key based on the count value associated with the first enhanced key identifier; and means for transmitting the first enhanced application key and an indication that the user device is using an enhanced key identifier to the remote application In another example, an apparatus for wireless communications, comprising: means for receiving a first key identifier from a user device; means for transmitting the first key identifier to an authentication server function; means for receiving, from the authentication server function, a first enhanced application key and an indication that the user device is using an enhanced key identifier; means for transmitting, to the user device, a response, the response including a request for an updated key identifier; means for receiving a second key identifier from the user device; means for transmitting the second key identifier to an authentication server function; means for receiving, from the authentication server function, a second enhanced application key; and means for communicating with the user device based on the second enhanced application key.

As another example, an apparatus for wireless communications is provided. The apparatus includes at least one memory comprising instructions; and at least one processor coupled to the at least one memory. The at least one process may: generate an anchor key based on an authentication server function key; associate a count value with the anchor key; generate a temporary device identifier based on the authentication server function key; generate an enhanced key identifier based on the count value, wherein the enhanced key identifier includes a portion of the temporary device identifier, wherein the portion of the temporary device identifier is less in size than an entire temporary device identifier; and transmit the enhanced key identifier to a remote application.

In another example, method for wireless communications is provided. The method includes generating an anchor key based on an authentication server function key; associating a count value with the anchor key; generating a temporary device identifier based on the authentication server function key; generating an enhanced key identifier based on the count value, wherein the enhanced key identifier includes a portion of the temporary device identifier, wherein the portion of the temporary device identifier is less in size than an entire temporary device identifier; and transmitting the enhanced key identifier to a remote application.

As another example, a non-transitory computer-readable medium is provided. The non-transitory computer-readable medium has stored thereon instructions that, when executed by at least one processor, cause the at least one processor to: generate an anchor key based on an authentication server function key; associate a count value with the anchor key; generate a temporary device identifier based on the authentication server function key; generate an enhanced key identifier based on the count value, wherein the enhanced key identifier includes a portion of the temporary device identifier, wherein the portion of the temporary device identifier is less in size than an entire temporary device identifier; and transmit the enhanced key identifier to a remote application.

In another example, an apparatus for wireless communications is provided. The apparatus includes means for generating an anchor key based on an authentication server function key; means for associating a count value with the anchor key; means for generating a temporary device identifier based on the authentication server function key; means for generating an enhanced key identifier based on the count value, wherein the enhanced key identifier includes a portion of the temporary device identifier, wherein the portion of the temporary device identifier is less in size than an entire temporary device identifier; and means for transmitting the enhanced key identifier to a remote application.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIGS. 5A-5D depict various example aspects of data structures for a wireless communication network, in accordance with some examples;

DETAILED DESCRIPTION

Figure 1:
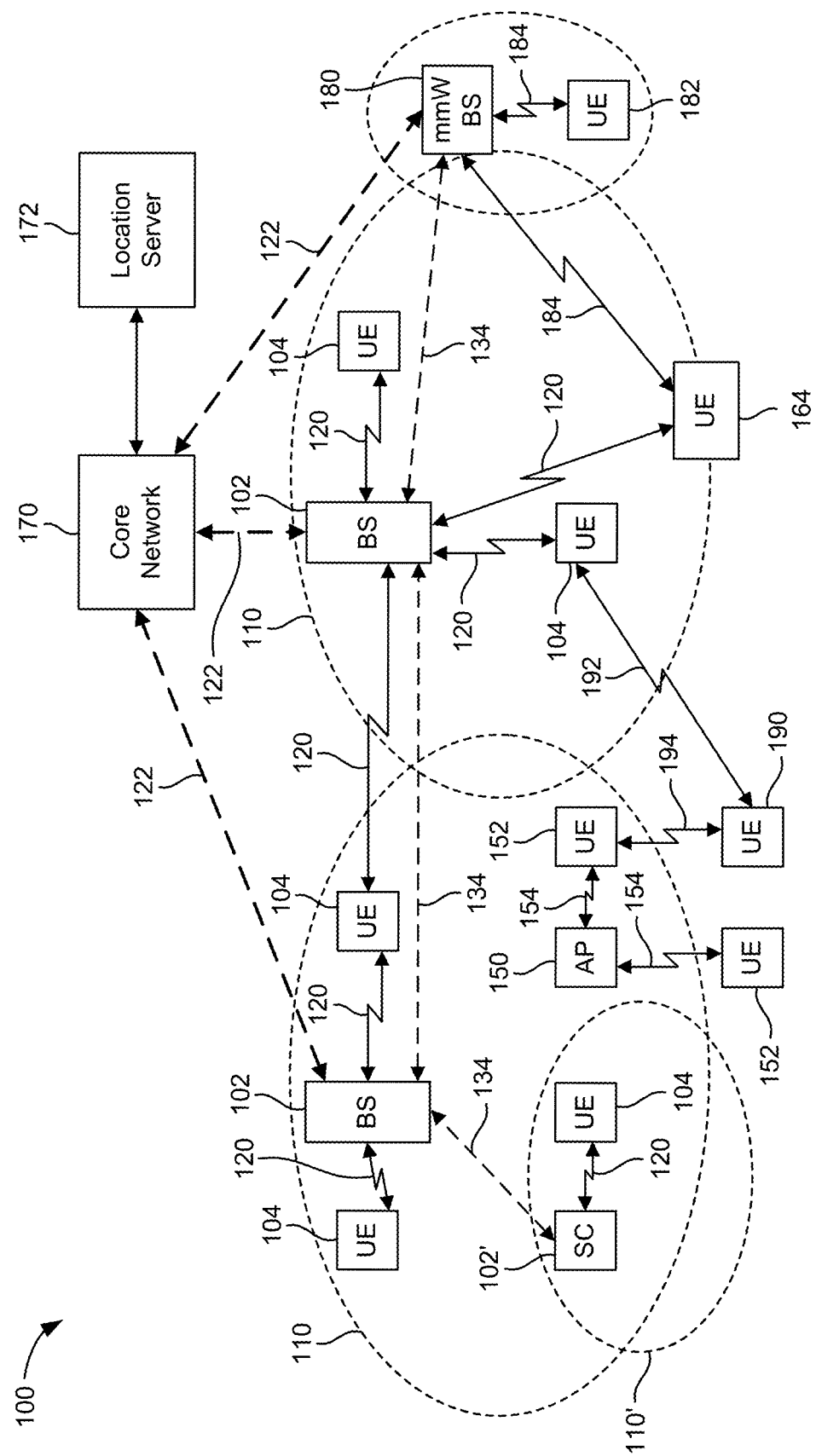
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a wireless device, such as user equipment (UE), may access an application function (AF) of the wireless network. The AF may include services of the wireless network such as a video streaming services, vehicle-to-everything (V2X) services, extended reality (XR) services, network applications, etc. In some wireless networks, a UE may be authenticated with a wireless network through a primary authentication procedure. As a part of the primary authentication process, certain authentication keys may be generated, for example, by a UE and an authentication server function (AUSF) of the wireless network.

An example of an authentication key can be an anchor key (e.g., an authentication and key management for applications (AKMA) anchor key ($K_{AKMA}$) or other type of anchor key). The anchor key (e.g., $K_{AKMA}$ or other anchor key) may be a root cryptographic key from which other keys may be derived. For instance, other keys may be derived from the anchor keys. Examples of keys that may be derived from the anchor key may include an application key, which may be associated with a key identifier used to identify the application key and/or a temporary device identifier. An application key may be a cryptographic key that may be used for communications with an AF. An AKMA Application Key ($K_{AF}$) is one example of an application key, an AKMA key identifier (A-KID) (which may be used to identify the $K_{AF}$) is one example of a key identifier, and an AKMA temporary UE identifier (A-TID) is an example of a temporary device identifier. For instance, a $K_{AF}$ (as an example of an application key), an A-KID (as an example of a key identifier), and an AKMA temporary UE identifier (A-TID) (as an example of a temporary device identifier) may be derived from a $K_{AKMA}$ (as an example of an anchor key). In some cases, the A-KID may include the A-TID and a home network identifier.

The AUSF may transmit the derived keys to the AF. The application key (e.g., the $K_{AF}$) may then be used between the UE and the AF. Thus, the application key (e.g., the $K_{AF}$) may be a cryptographic key that may be used for communications between the UE and the AF. In some cases, once derived, a certain application key (e.g., the $K_{AF}$) may not be refreshed outside of another primary authentication procedure. In some cases, it may be useful to allow the application key (e.g., the $K_{AF}$) to be refreshed without performing another primary authentication procedure.

Systems, apparatuses, electronic devices, methods (also referred to as processes), and computer-readable media (collectively referred to herein as "systems and techniques") are described herein for application key refresh (e.g., AKMA Application Key ($K_{AF}$) refresh) using an enhanced key identifier (e.g., an enhanced A-KID). In some cases, an application server function may generate an application key refresh (e.g., a $K_{AF}$ refresh), and in some cases, the anchor key ($K_{AKMA}$) and key identifier (e.g., A-KID) may be enhanced to include a count value. This count value may be used to refresh an enhanced application key (e.g., an enhanced $K_{AF}$). For example, the count value, in some cases, may be updated (e.g., incremented) and the application key (e.g., $K_{AF}$) refreshed. The enhanced key identifier (e.g., A-KID), which identifies the application key (e.g., the $K_{AF}$), may include a shortened portion of the temporary device identifier (e.g., A-TID), such as less than the entire A-TID, along with the count value and the home network identifier. For example, an A-TID for a non-enhanced A-KID may be 256 bits long, while the shortened portion of the A-TID may be 128 bits long.

In some cases, the count value included in the key identifier (e.g., A-KID) may be encrypted. The count value may be encrypted based on a first function. For example, the encrypted count value may be determined by XORing the count value with the output of a first function. The first function may be a key derivation function (KDF) with parameters that may include a key (e.g., Kenc) derived from the anchor key (e.g., the $K_{AKMA}$), an identifier of the application function being accessed, and/or a message authentication code (MAC). The MAC may be a relatively short authentication and/or integrity check value/message that helps verify the sender and/or integrity of a message and the MAC may be updated anytime key including the MAC is updated. The MAC may be generated based on a second function, which may also be a KDF with a set of parameters. The parameters for the second function may include a key (e.g., $K_{mac}$) derived from the anchor key (e.g., the $K_{AKMA}$), the temporary device identifier (e.g., A-TID), and/or an identifier of the application function being accessed.

In some cases, the AF may request that the application key (e.g., the $K_{AF}$) be refreshed as needed, such as at a beginning of a communication session. For example, an indication to refresh the key identifier may be received, for example, from a remote application such as the AF. The count value of the enhanced application key (e.g., the $K_{AF}$) may be incremented and the enhanced application key (e.g., the enhanced $K_{AF}$) may be refreshed based on the incremented count value. The key identifier (e.g., A-KID) may also be refreshed based on the incremented count value. The refreshed key identifier (e.g., refreshed A-KID) may be transmitted to the remote application. By deriving the application key (e.g., the $K_{AF}$) based, at least in part, on the count value, the application key (e.g., the $K_{AF}$) may be refreshed without having to update the anchor key (e.g., the $K_{AKMA}$), such as via a primary authentication process.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
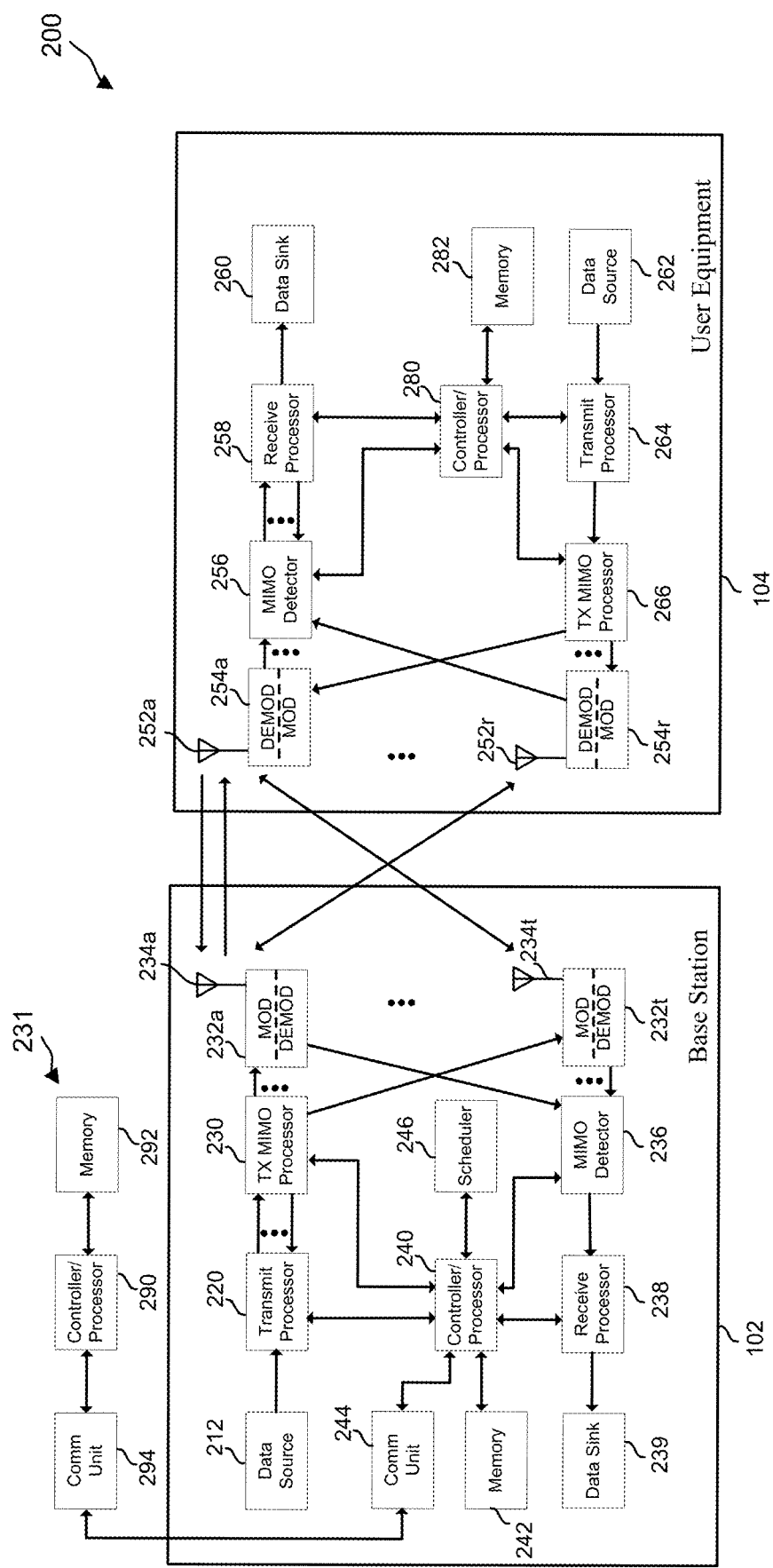
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
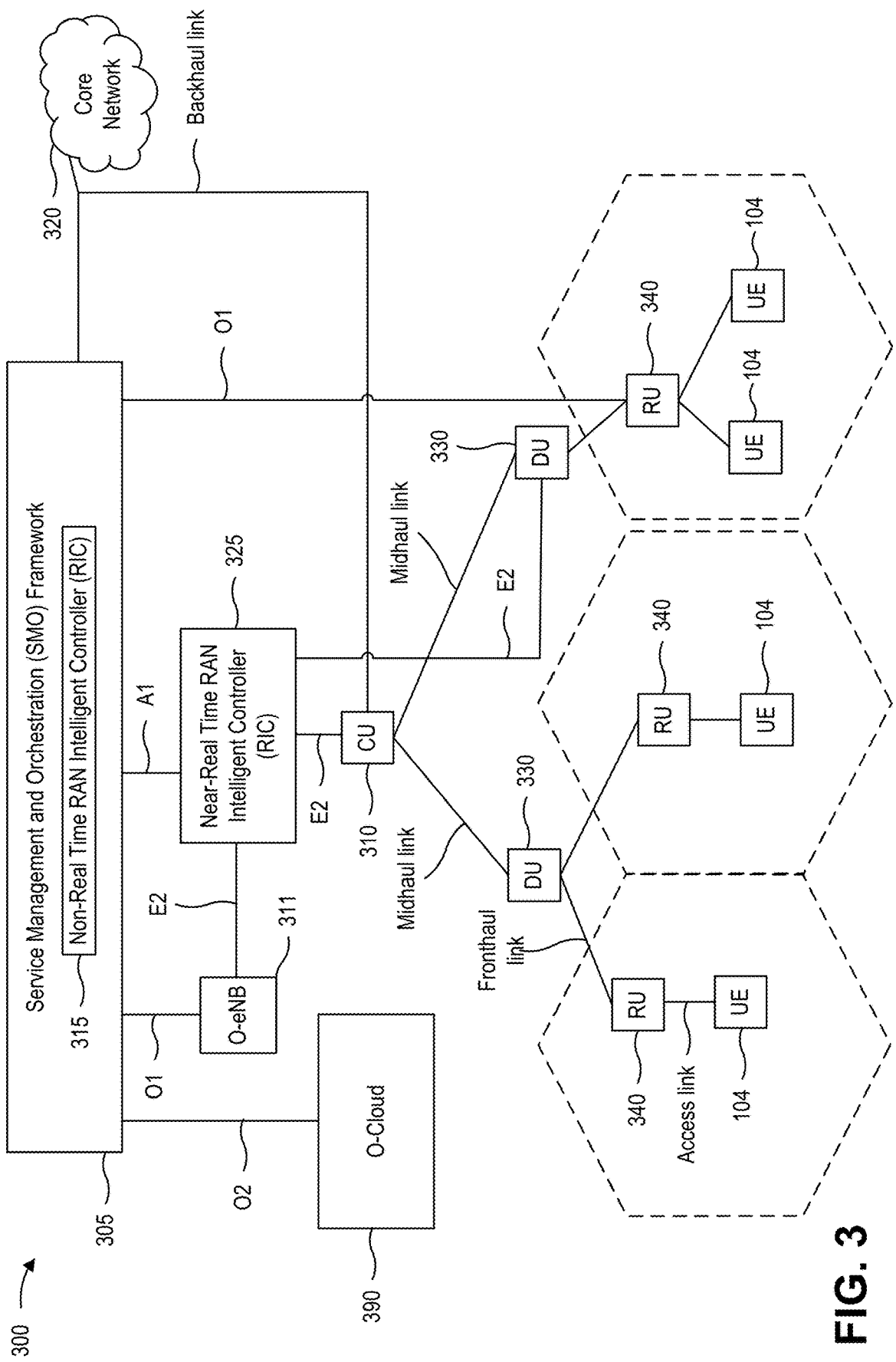
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUs 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
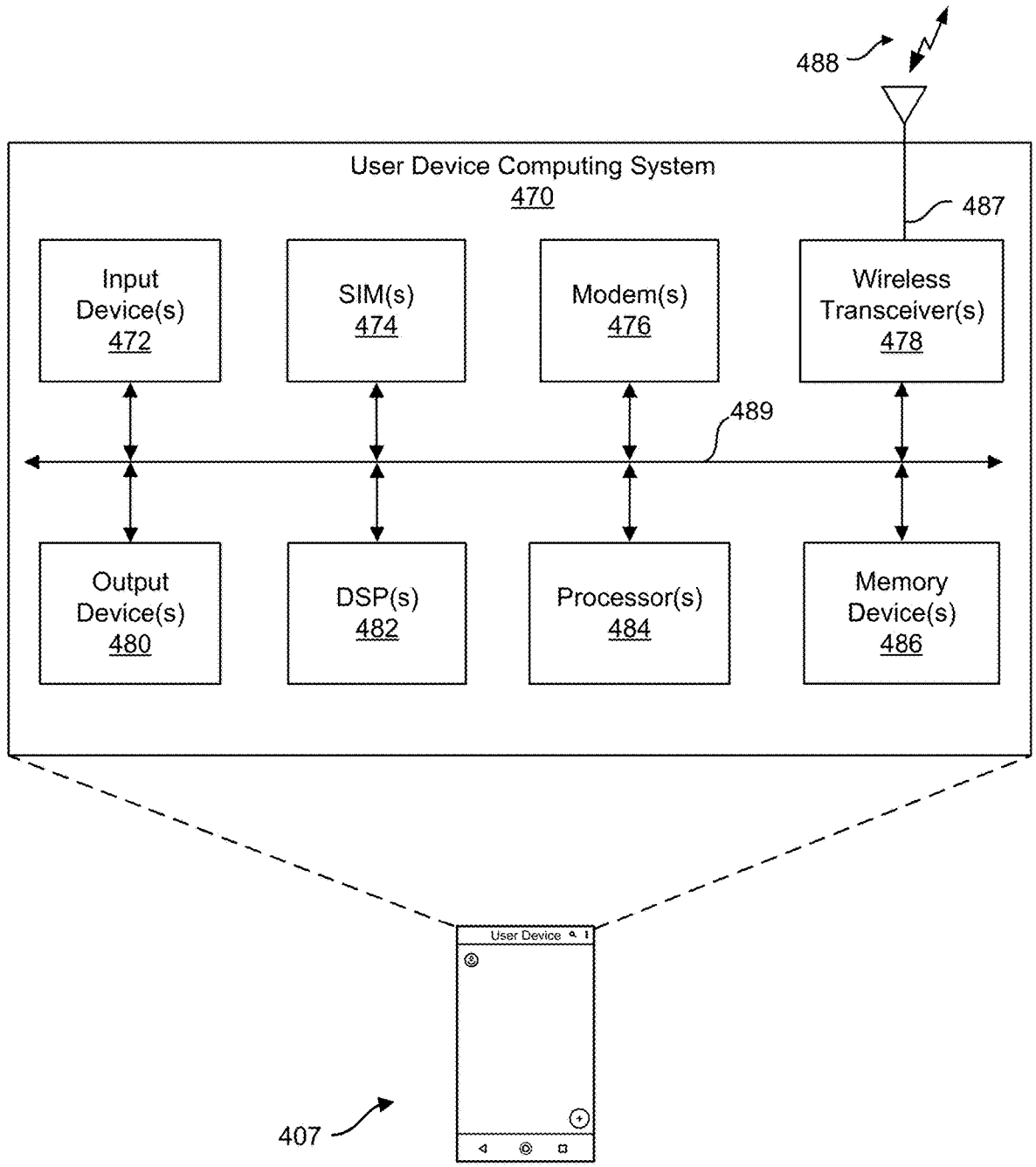
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

FIGS. 5A-5D depict various example aspects of data structures for a wireless communication system, such as wireless communication system 100 of FIG. 1. FIGS. 5A-5D depict aspects of data structures for a wireless communication network, such as wireless communication network 100 of FIG. 1. In particular, FIG. 5A is a diagram 500 illustrating an example of a first subframe within a 5G (e.g., 5G NR) frame structure, FIG. 5B is a diagram 530 illustrating an example of DL channels within a 5G subframe, FIG. 5C is a diagram 550 illustrating an example of a second subframe within a 5G frame structure, and FIG. 5D is a diagram 580 illustrating an example of UL channels within a 5G subframe.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 5A and 5C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 2μ×15 kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 5A-5D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 5A, some of the REs carry reference (pilot) signals (RS) for a UE (e.g., UE 104, UE 152, UE 190). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 5B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104, UE 152, UE 190) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 5C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 5D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In some cases, certain wireless systems may include authentication systems. For example, certain cellular wireless systems, such as 5G system, may include a 5G-authentication and key management (AKA) procedure, among other procedures. The 5G-AKA procedure may be the procedure by which a UE and a network mutually authenticate and derive cryptographic keys to protect data. In some cases, additional cryptographic keys may be derived based on an authentication procedure.

Figure 6:
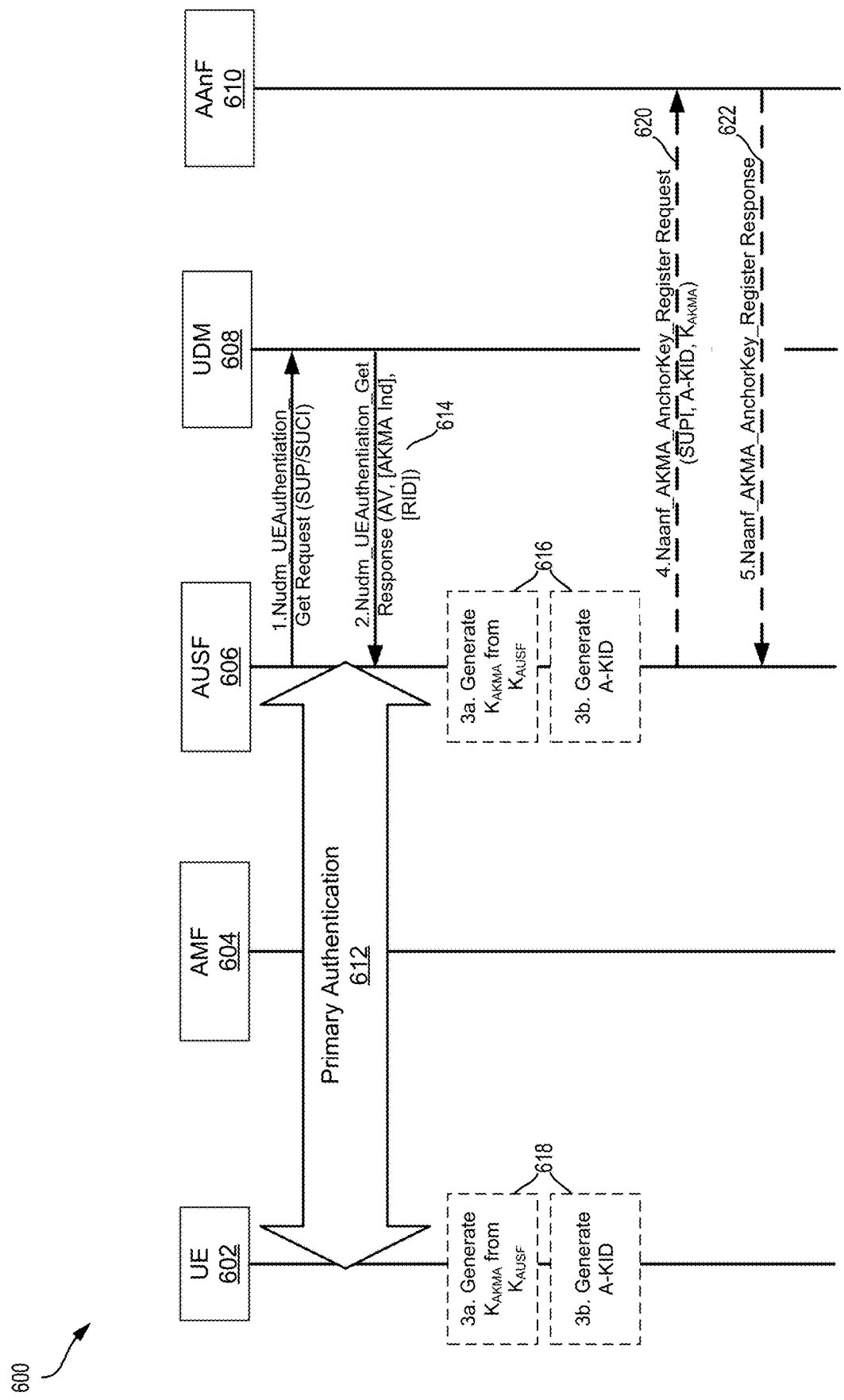
FIG. 6 illustrates an example primary authentication and key derivation procedure, in accordance with aspects of the present disclosure.

FIG. 6 illustrates an example 600 primary authentication and key derivation procedure, in accordance with aspects of the present disclosure. In some cases, prior to primary authentication 612, the UE 602 may transmit (not shown) a temporary identifier such as a 5G NR global unique identifier (5G-GUTI) or encrypted permanent identifier to the network. In some cases, the transmission may be performed through a NAS signaling message. In example 600, a UE 602 may perform a primary authentication procedure 612 with an access and mobility management function (AMF) 604 and an authentication server function (AUSF) 606. The AUSF 606 may interact with a unified data management UDM 608 to obtain authentication information such as subscription credentials (e.g., AKA Authentication vectors) and the authentication method using the Nudm_UEAuthentication_Get Request service operation. In some cases, in a response 614 from the UDM 608 to the AUSF 606, the UDM 608 may indicate that an AKMA anchor key ($K_{AKMA}$) should be generated for the UE 602. The $K_{AKMA}$ may be used to generate an AKMA Application Function Key ($K_{AF}$). In some cases, a routing indicator (RID) may also be included in the response 614. If the AUSF 606 receives the indication that the $K_{AKMA}$ should be generated for the UE, the AUSF 606 may generate 616 the $K_{AKMA}$ and an AKMA key identifier (A-KID) from an authentication server function key $K_{AUSF}$ of the AUSF 606. The authentication server function key $K_{AUSF}$ may be a cryptographic key shared by the AUSF 606 and the UE 602 that may be used to derive a particular $K_{AKMA}$. In some cases, an A-TID, or AKMA temporary UE identifier (e.g., temporary device identifier), may also be derived from the key $K_{AUSF}$ of the AUSF 606. The A-TID may be included as a part of the A-KID along with a home network identifier for the UE. During the primary authentication 612, $K_{AUSF}$ may be derived at the UE 602 and the UE 602 may also generate 618 the $K_{AKMA}$ and the A-KID from $K_{AUSF}$. In some cases, the A-KID may be a unique identifier that may be used to identify a particular $K_{AKMA}$ The AUSF 606 may select an AKMA anchor function (AAnF) 610 and send an anchor key registration request 620 including the generated A-KID and $K_{AKMA}$ to the AAnF 610. The AAnF 610 may store the information sent by the AUSF 606 and send an anchor key registration response 622 back to the AUSF 606.

Figure 7:
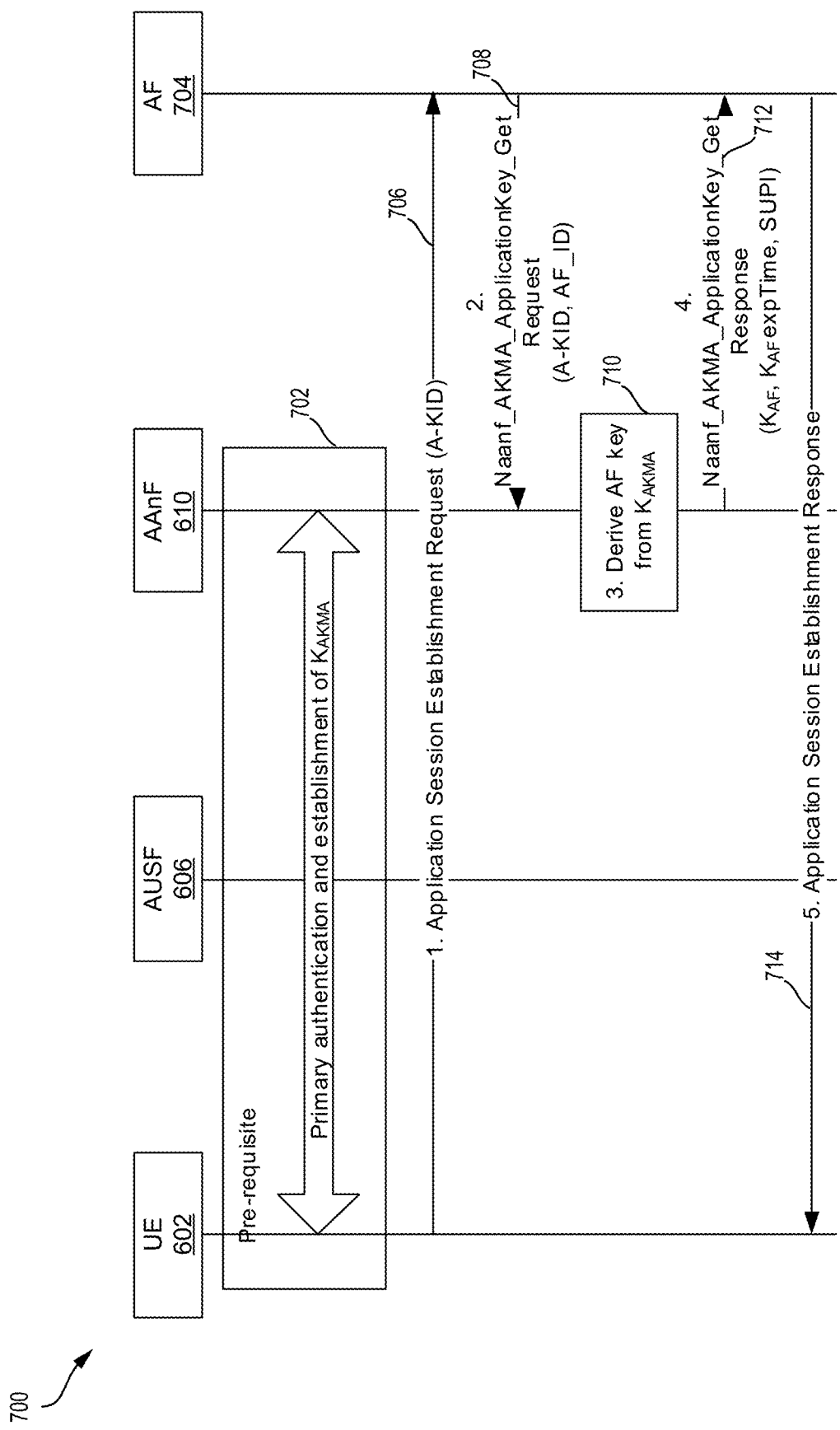
FIG. 7 illustrates an example procedure for obtaining a $K_{AF}$ based on an AKMA key identifier (A-KID), in accordance with aspects of the present disclosure.

FIG. 7 illustrates an example 700 procedure for obtaining a $K_{AF}$ based on an A-KID, in accordance with aspects of the present disclosure. In example 700, after primary authentication and establishment of $K_{AKMA}$ and A-KID 702 by UE 602, the UE 602 may initiate communication with an application function (AF) 704 (e.g., a remote application executing on a server connected to the network, such as the core network 170 of FIG. 1) by sending the AF 704 an application session establishment request message 706, the application session establishment request message 706 including the A-KID. If the AF 704 does not have an active context associated with the A-KID, then the AF 704 may send message 708 (e.g., a Naanf_AKMA_ApplicationKey_Get request) to the AAnF 610 with the A-KID to request the $K_{AF}$ for the UE 602. The AF 704 also includes its identity (AF_ID) in the request. In some cases, the AAnF 610 may derive 710 $K_{AF}$ from the $K_{AKMA}$ if the AAnF 610 does not already have $K_{AF}$. The AAnF 610 may then send response 712 (e.g., Naanf_AKMA_ApplicationKey_Get response) to the AF 704 with a SUPI, $K_{AF}$ and the $K_{AF}$ expiration time. The AF 704 may then send an Application Session Establishment Response 714 including a $K_{AF}$ to the UE. The UE and the AF 704 may then use the $K_{AF}$ to communicate securely via encrypted protocols, such as via a transport layer security (TLS) tunnel or digest authentication.

In some cases, $K_{AF}$ may be derived from $K_{AKMA}$ based on a predefined key derivation function (KDF) based on a set of parameters. For example, $K_{AF}$ may be derived from $K_{AKMA}$ using three parameters along with an input key. In some cases, the parameters may include FC, which may be equal to 0x82, P0, which may be equal to an AF identifier (AF_ID), and L0, which may be equal to a length of AF_ID. In some cases, AF_ID may be constructed based on a fully qualified domain name of the AF 704 and a specified Ua* security protocol identifier (e.g., an alphanumeric identifier for a security protocol being used). The input key to the KDF may be $K_{AKMA}$. In some cases, the KDF may be a predefined function that can generate a set of numbers (e.g., a key) based on an input set of parameters and different parameter values and number of parameters in the set of parameters can be used to define the output of the KDF.

In some cases, once primary authentication has been run and $K_{AKMA}$ has been used to generate $K_{AF}$ for use between the UE 602 and the AF 704, the $K_{AF}$ may have a fixed value (e.g., the value of $K_{AF}$ remains the same until a new primary authentication procedure is run). In some cases, the primary authentication procedure may not be run for a substantial amount of time (e.g., multiple hours or days) and it may be helpful to refresh the $K_{AF}$ to increase communication security between the UE 602 and the AF 704. For example, the $K_{AF}$ may be used to establish a TLS connection with an application server on the network and it may be desirable to have a different $K_{AF}$ for each session. Thus, if the user accesses the application server, the user may use a first $K_{AF}$ for that session. If the session expires (e.g., times out, user logs out, etc.), and the user access the application server again, the user may use a different second $K_{AF}$ for a second session.

In some cases, to enhance the procedure for generating $K_{AF}$, $K_{AKMA}$ may be modified to include an associated count value. For example, the count value may be a number value associated with a $K_{AKMA}$. In some cases, the count value may be initially set to zero when a $K_{AKMA}$ is initially generated by the UE 602. The count value may be increased (e.g., by the UE 602) each time an A-KID, $K_{AF}$ pair is calculated from $K_{AKMA}$. In some cases, the AAnF 610 may hold the highest count value received and the AAnF 610 may check a newly received $K_{AKMA}$ count value is higher than a stored count value to ensure that the key is fresh (e.g., the latest). In some cases, the AAnF 610 may save the last few $K_{AKMA}$ count value received to address, for example, race conditions.

In some cases, the UE 602 may be provisioned to use enhanced procedures for generating $K_{AF}$. The UE 602 may include a universal subscriber identity module (USIM) and mobile equipment (ME). For example, the UE 602 may obtain an indication from the USIM or from a memory on the ME to use enhanced A-KIDs along with a $K_{AKMA}$ with an associated count value. In some cases, this indication may be provided if the AUSF 606 and AAnF 610 of the network also support enhanced procedures for generating $K_{AF}$ and support using enhanced A-KIDs and a $K_{AKMA}$ with an associated count value.

In some cases, the procedure for generating $K_{AF}$ (e.g., as shown in FIG. 7) may also be enhanced to allow the $K_{AF}$ to be refreshed. For example, a UE 602 which supports the enhanced procedure for generating $K_{AF}$ may transmit the enhanced A-KID to the AF 704 as a part of the application session establishment request message 706. In some cases, the UE 602 may generate a normal A-KID during a primary authentication (e.g., primary authentication procedure 612 of FIG. 6) and key derivation procedure (e.g., generating 618 the $K_{AKMA}$ and the A-KID from $K_{AUSF}$, as shown in FIG. 6). The UE 602 may then determine to use an enhanced A-KID, for example, based on an indication from the USIM or from a memory on the ME to use enhanced A-KIDs. The UE 602 may generate an enhanced A-KID and $K_{AF}$ prior to transmission to the AF 704 in the application session establishment request message 706. For example, the UE 602 may increment the $K_{AKMA}$ count value, add the incremented count values to the $K_{AF}$ generation to generate an enhanced $K_{AF}$, generate the enhanced A-KID, and transmit the enhanced $K_{AF}$ and enhanced A-KID to the AF 704 in the application session establishment request message 706. In some cases, the UE 602 may determine to use an enhanced A-KID and directly generate an enhanced A-KID without previously generating a normal A-KID. In such cases, the UE 602 may generate and transmit the enhanced A-KID in substantially the same manner as described above and below. By allowing the enhanced A-KID to include a count (e.g., freshness parameter), the A-KID may be used to derive a fresh $K_{AF}$.

In some cases, the A-KID may be enhanced by including a parameter, such as a freshness parameter (e.g., count value), that may be used to derive a new (e.g., refresh) the enhanced $K_{AF}$. In some examples, a normal A-KID may include a 256 bit long A-TID derived from a $K_{AKMA}$. In some cases, an enhanced A-KID may be formed from a shortened A-TID. The enhanced A-TID may also include an encrypted count and/or a message authentication code (MAC). The shortened A-TID may be a first 128 bits of the A-TID. The encrypted count value may be 32 bits long and may be an encrypted version of the count value. The count value may be encrypted to avoid an eavesdropper being able to easily determine the count value. The encrypted count value may be determined by XORing the count value with the output of a first function. In some cases, the first function may be a KDF function with a set of parameters. The set of parameters for the first function may include a key $K_{enc}$, the MAC, and/or the AF identifier (AF_ID). In some cases, the set of parameters for the first function may also include the A-TID (e.g., either a normal A-KID, or an enhanced A-KID). In some cases, the $K_{enc}$ may be a key derived from $K_{AKMA}$. In some cases, key $K_{enc}$ may be statically derived (e.g., with a fixed set of parameters) using the KDF function from $K_{AKMA}$ In some cases, the MAC may be 96 bits long. The MAC may be determined based on a second function. In some cases, the second function may be a KDF function with a set of parameters. The set of parameters for the second function may include a K mac, the A-TID, and/or the AF_ID. In some cases, the K mac may also be statically derived using the KDF function. In some cases, the fixed set of parameters for deriving the $K_{enc}$ and K m, may include different parameter values and/or a number of parameters. Including the count value in the MAC allows the MAC to be updated as the count value is updated.

In some cases, an enhanced $K_{AF}$ may be derived from the $K_{AKMA}$ along with the count value. For example, the set of parameters for the KDF function used to generate the enhanced $K_{AF}$ may include parameters related to the count value. In some cases, the set of parameters may include a P1 parameter set to the count value and a L1 parameter set to a length of the count value.

The AF 704 may send the enhanced A-KID to the AAnF 610, as shown, in message 708. In some cases, the AAnF 610 may have previously received a normal A-KID for the UE 602 from the AUSF 606 in the anchor key registration request 620. The AAnF 610 may match a portion of the enhanced A-KID from AF 704 to stored normal A-KIDs and determine that an enhanced A-KID is being used. The AAnF 610 may determine that an enhanced A-KID is being used if a first 128 bits of the enhanced A-KID match those of a stored A-KID. In some cases, the AAnF 610 may check that the received $K_{AKMA}$ count value is higher than a stored count value to ensure that the key is fresh (e.g., the latest). In some cases, the AAnF 610 may XOR the encrypted count value that is part of the enhanced A-KID with the output of the first function in order to get the count value included in the enhanced A-KID. In some cases, the AAnF may also check the MAC value included in the enhanced A-KID.

The AAnF 610 may use the count value in the enhanced A-KID to derive 710 a new enhanced $K_{AF}$ value. The AAnF 610 may transmit the new enhanced $K_{AF}$ value along with an indication to the AF 704 in response 712 that an enhanced A-KID is being used by the UE. In cases where the AF 704 is a legacy AF 704 that does not support enhanced A-KIDs, the indication that the UE is using the enhanced A-KID may be discarded or ignored by the legacy AF 704, while still using the new enhanced $K_{AF}$ value. If the AF 704 supports using enhanced A-KIDs, the AF 704 may, at any point, request a new enhanced A-KID from UE 602. In some cases, the AF 704 may request a new A-KID in the Application Session Establishment Response 714. The UE 602, in response to the request for a new enhanced A-KID, may increment the count associated with $K_{AKMA}$, generate a new enhanced $K_{AF}$, and generate a new enhanced A-KID. The UE 602 may send a new application session establishment request message 706 based on the new A-KID. The AF 704 may then send the new enhanced A-KID to the AAnF 610 in message 708, and the AAnF 610 may, in response 712, send back to the AF 704 a new enhanced $K_{AF}$ based on the new A-KID. The AF 704 may then respond back to the UE 602 with a new the Application Session Establishment Response 714. The AF 704 may establish an application session with the UE 602 using the new enhanced $K_{AF}$.

Figure 8:
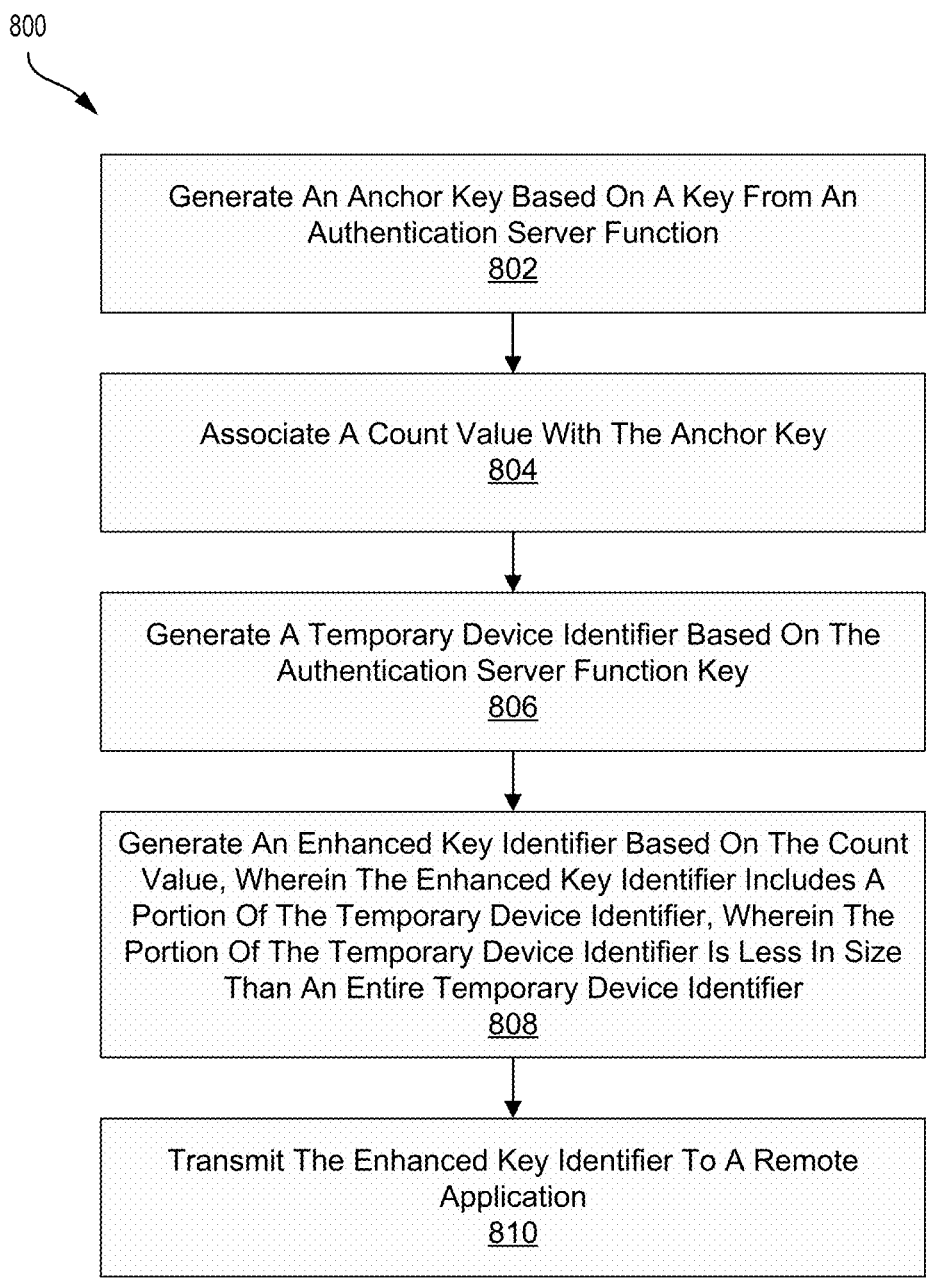
FIG. 8 is a flow diagram of a process for AKMA application key refresh, in accordance with aspects of the present disclosure.

FIG. 8 is a flow diagram of a process 800 for AKMA application key refresh, in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, network component, or other type of computing device. The operations of the process 800 may be implemented as software components that are executed and run on one or more processors. In some cases, the computing device may include an indication, such as a configuration, that the UE may use an enhanced privacy technique, such as techniques discussed in accordance with aspects of the present disclosure.

At block 802, the computing device (or component thereof) may generate an anchor key based on a key from an authentication server function. In some cases, the computing device (or component thereof) may determine to use the enhanced key identifier (e.g., enhanced A-KID) based on an indication stored in at least one of the memory or a universal subscriber identity module.

At block 804, the computing device (or component thereof) may associate a count value with the anchor key.

At block 806, the computing device (or component thereof) may generate a temporary device identifier based on the authentication server function key.

At block 808, the computing device (or component thereof) may generate an enhanced key identifier based on the count value, wherein the enhanced key identifier includes a portion of the temporary device identifier, wherein the portion of the temporary device identifier is less in size than an entire temporary device identifier. In some cases, the enhanced key identifier includes an encrypted count value. In some cases, the computing device (or component thereof) may generate the encrypted count value based on the count value and results from a first function. In some cases, the results from the first function are based on a first key derived from the anchor key. In some cases, the enhanced key identifier is further generated based on a message authentication code. In some examples, the message authentication code is further generated based on at least one of the portion of the temporary device identifier or an identifier of a remote application. In some cases, the message authentication code is generated based on a second key derived from the anchor key. In some cases, the computing device (or component thereof) may determine to use the enhanced key identifier based on an indication stored in at least one of the memory or a universal subscriber identity module. In some examples, the portion of the temporary device identifier comprises a first 128 bits of the temporary device identifier.

At block 810, the computing device (or component thereof) may transmit the enhanced key identifier to a remote application. In some cases, the computing device (or component thereof) may receive an indication, from the remote application, to refresh the enhanced key identifier; increment the count value based on the received indication; generate a refreshed enhanced key identifier based on the incremented count value; and transmit the refreshed enhanced key identifier to the remote application. In some cases, the computing device (or component thereof) may generate an application key for use with the remote application based on the anchor key and the count value.

Figure 9:
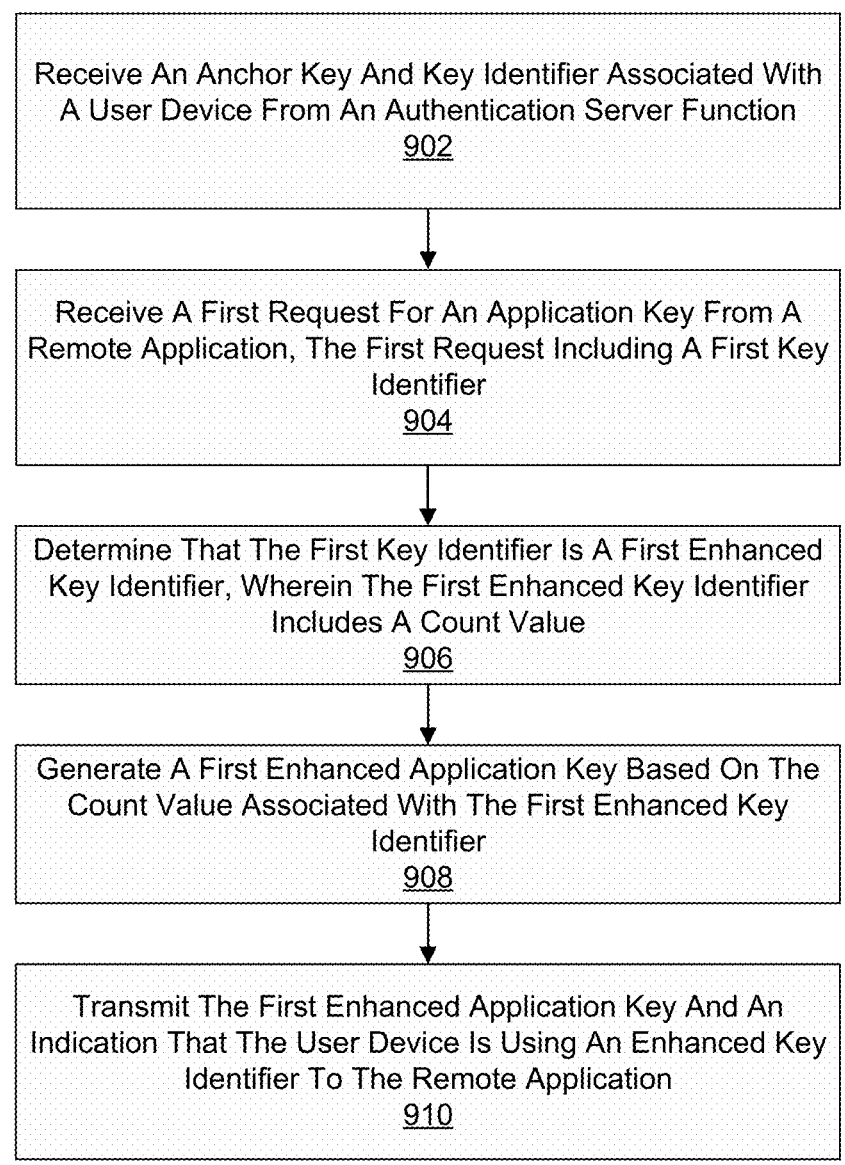
FIG. 9 is a flow diagram of a process for AKMA application key refresh, in accordance with aspects of the present disclosure.

FIG. 9 is a flow diagram of a process 900 for AKMA application key refresh, in accordance with aspects of the present disclosure. The process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, network component, or other type of computing device. The operations of the process 900 may be implemented as software components that are executed and run on one or more processors. In some cases, the computing device may include an indication, such as a configuration, that the UE may use an enhanced privacy technique, such as techniques discussed in accordance with aspects of the present disclosure.

At block 902, the computing device (or component thereof) may receive an anchor key and key identifier associated with a user device from an authentication server function. At block 904, the computing device (or component thereof) may receive a first request for an application key from a remote application, the first request including a first key identifier.

At block 906, the computing device (or component thereof) may determine that the first key identifier is a first enhanced key identifier, wherein the first enhanced key identifier includes a count value. In some cases, the count value associated with the first enhanced key identifier comprises an encrypted count value.

At block 908, the computing device (or component thereof) may generate a first enhanced application key based on the count value associated with the first enhanced key identifier. In some cases, the anchor key is associated with an initial count value. In some cases, the computing device (or component thereof) may decrypt the encrypted count value based on the initial count value and results from a first function. In some cases, the results from the first function are based on a first key derived from the anchor key. In some cases, the enhanced key identifier is further generated based on a message authentication code. In some cases, the message authentication code is generated based on a second key derived from the anchor key.

At block 910, the computing device (or component thereof) may transmit the first enhanced application key and an indication that the user device is using an enhanced key identifier to the remote application. In some cases, the computing device (or component thereof) may receive a second request for an application key from a remote application, the second request including a second key identifier; determine that the second key identifier is a second enhanced key identifier; generate a second enhanced application key based on the count value associated with the second enhanced key identifier; and transmit the second enhanced application key to the remote application.

Figure 10:
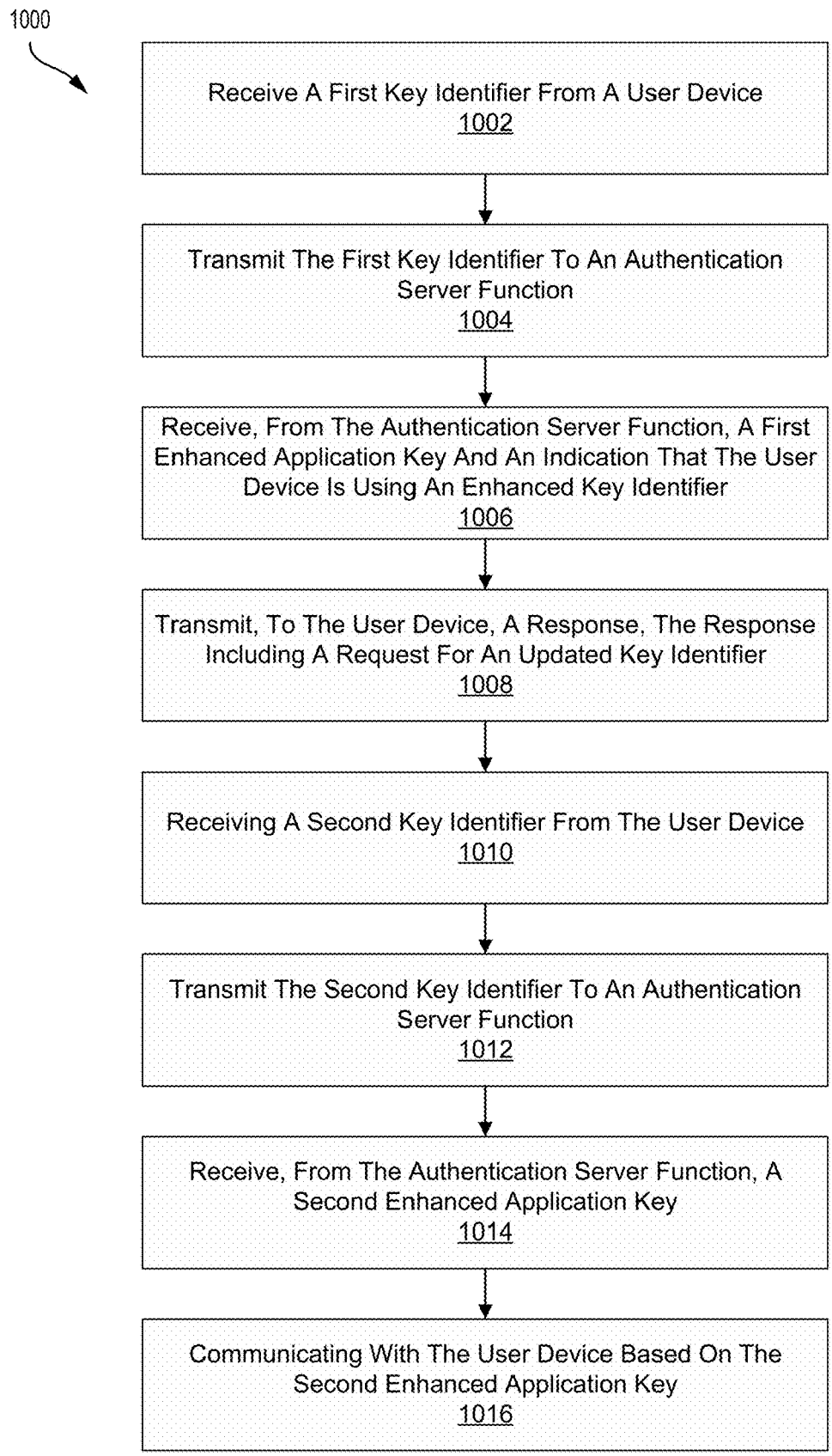
FIG. 10 is a flow diagram of a process for AKMA application key refresh, in accordance with aspects of the present disclosure.

FIG. 10 is a flow diagram of a process 1000 for AKMA application key refresh, in accordance with aspects of the present disclosure. The process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, network component, or other type of computing device. The operations of the process 1000 may be implemented as software components that are executed and run on one or more processors. In some cases, the computing device may include an indication, such as a configuration, that the UE may use an enhanced privacy technique, such as techniques discussed in accordance with aspects of the present disclosure.

At block 1010, the computing device (or component thereof) may receive a first key identifier from a user device. At block 1010, the computing device (or component thereof) may transmit the first key identifier to an authentication server function. At block 1010, the computing device (or component thereof) may receive, from the authentication server function, a first enhanced application key and an indication that the user device is using an enhanced key identifier.

At block 1010, the computing device (or component thereof) may transmit, to the user device, a response, the response including a request for an updated key identifier. At block 1010, the computing device (or component thereof) may receive a second key identifier from the user device. At block 1010, the computing device (or component thereof) may transmit the second key identifier to an authentication server function.

At block 1010, the computing device (or component thereof) may receive, from the authentication server function, a second enhanced application key. At block 1010, the computing device (or component thereof) may and communicate with the user device based on the second enhanced application key.

In some examples, the processes described herein (e.g., process 800, process 900, process 1000 and/or other process described herein) may be performed by a computing device or apparatus (e.g., a UE or a base station). In another example, the process 800, process 900, and/or process 1000 may be performed by the UE 104, base stations 102, and/or component of the core network 170 of FIG. 1. In another example, the process 800 process 800, process 900, and/or process 1000 may be performed by a computing device with the computing system 1100 shown in FIG. 11.

Figure 11:
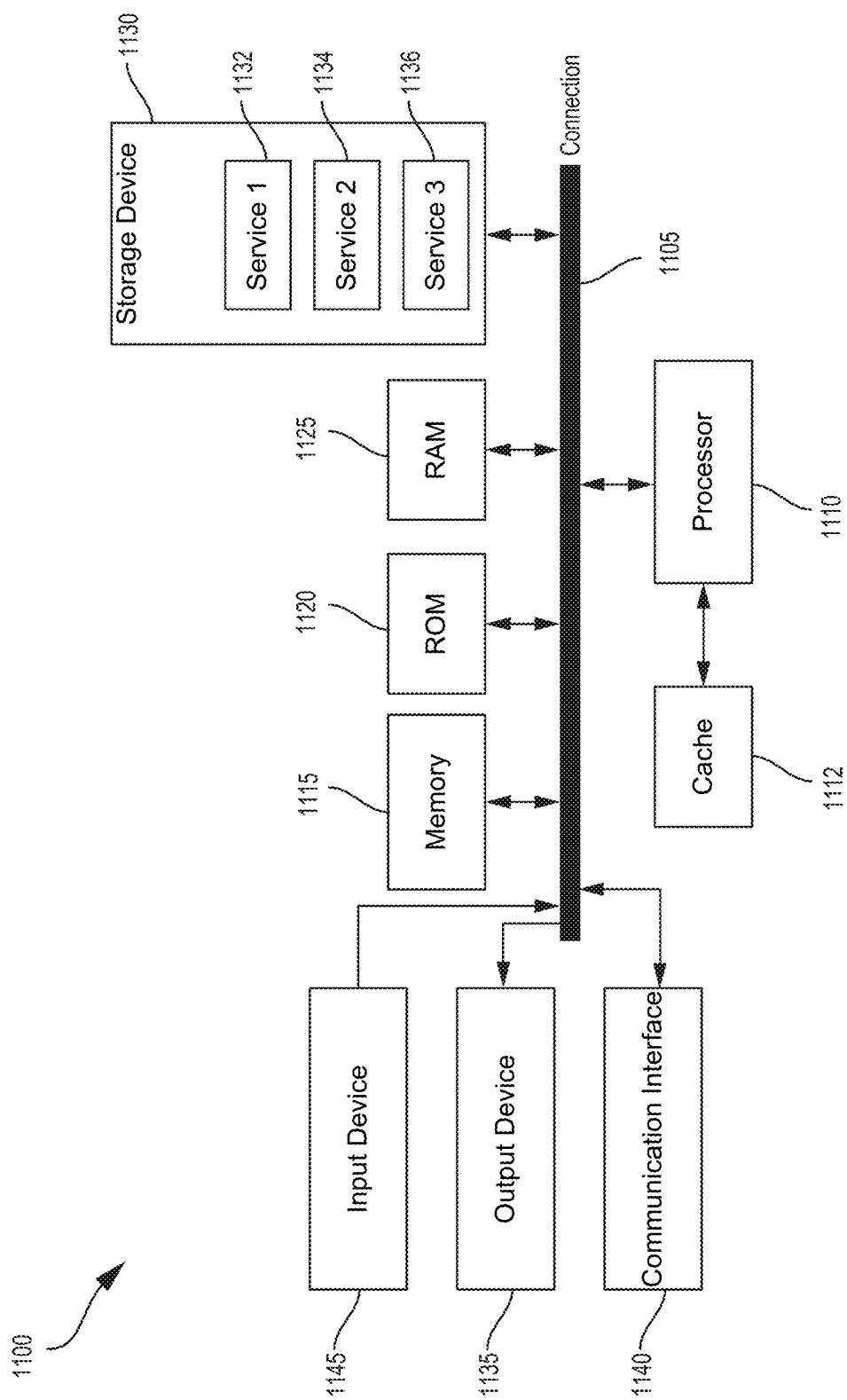
FIG. 11 is a diagram illustrating an example of a computing system, according to aspects of the disclosure.

FIG. 11 is a diagram illustrating an example of a system for implementing certain aspects of the present technology. In particular, FIG. 11 illustrates an example of computing system 1100, which may be for example any computing device making up internal computing system, a remote computing system, a camera, or any component thereof in which the components of the system are in communication with each other using connection 1105. Connection 1105 may be a physical connection using a bus, or a direct connection into processor 1110, such as in a chipset architecture. Connection 1105 may also be a virtual connection, networked connection, or logical connection.

In some embodiments, computing system 1100 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 may include a cache 1112 of high-speed memory connected directly with, in close proximity to, or integrated as part of processor 1110.

Processor 1110 may include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms. In some instances, multimodal systems may enable a user to provide multiple types of input/output to communicate with computing system 1100.

Computing system 1100 may include communications interface 1140, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 may include software services, servers, services, etc., that when the code that defines such software is executed by the processor 1110, it causes the system to perform a function. In some embodiments, a hardware service that performs a particular function may include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly.

Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus for wireless communications, comprising: at least one memory comprising instructions; and at least one processor coupled to the at least one memory and configured to: generate an anchor key based on a key from an authentication server function; associate a count value with the anchor key; generate an enhanced key identifier based on the count value; and transmit the enhanced key identifier to a remote application.

Aspect 2. The apparatus of aspect 1, wherein the at least one processor is further configured to: receive an indication, from the remote application, to refresh the enhanced key identifier; increment the count value; generate a refreshed enhanced key identifier based on the incremented count value; and transmit the refreshed enhanced key identifier to the remote application.

Aspect 3. The apparatus of any of aspects 1-2, wherein the enhanced key identifier is generated based on an encrypted count value.

Aspect 4. The apparatus of aspect 3, wherein the at least one processor is further configured to generate the encrypted count value based on the count value and results from a first function.

Aspect 5. The apparatus of aspect 4, wherein the results from the first function are based on a first key derived from the anchor key.

Aspect 6. The apparatus of aspect 3, wherein the enhanced key identifier is further generated based on a message authentication code.

Aspect 7. The apparatus of aspect 6, wherein the message authentication code is generated based on a second key derived from the anchor key.

Aspect 8. The apparatus of any of aspects 1-7, wherein the at least one processor is configured to determine to use the enhanced key identifier based on an indication stored in at least one of the memory or a universal subscriber identity module.

Aspect 9. The apparatus of any of aspects 1-8, wherein the at least one processor is further configured to generate an application key for use with the remote application based on the anchor key and the count value.

Aspect 10. An apparatus for wireless communications, comprising: at least one memory comprising instructions; and at least one processor coupled to the at least one memory and configured to: receive an anchor key and key identifier associated with a user device from an authentication server function; receive a first request for an application key from a remote application, the first request including a first key identifier; determine that the first key identifier is a first enhanced key identifier, wherein the first enhanced key identifier includes a count value; generate a first enhanced application key based on the count value associated with the first enhanced key identifier; and transmit the first enhanced application key and an indication that the user device is using an enhanced key identifier to the remote application.

Aspect 11. The apparatus of aspect 10, wherein the at least one processor is further configured to: receive a second request for an application key from a remote application, the second request including a second key identifier; determine that the second key identifier is a second enhanced key identifier; generate a second enhanced application key based on the count value associated with the second enhanced key identifier; and transmit the second enhanced application key to the remote application.

Aspect 12. The apparatus of any of aspects 10-12, wherein the count value associated with the first enhanced key identifier comprises an encrypted count value.

Aspect 13. The apparatus of aspect 12, wherein the anchor key is associated with an initial count value, and wherein the at least one processor is further configured to decrypt the encrypted count value based on the initial count value and results from a first function.

Aspect 14. The apparatus of aspect 13, wherein the results from the first function are based on a first key derived from the anchor key.

Aspect 15. The apparatus of aspect 12, wherein the enhanced key identifier is further generated based on a message authentication code.

Aspect 16. The apparatus of aspect 15, wherein the message authentication code is generated based on a second key derived from the anchor key.

Aspect 17. The apparatus of any of aspects 10-17, wherein the at least one processor is further configured to generate the first enhanced application key for use with the remote application based on the anchor key.

Aspect 18. An apparatus for wireless communications, comprising: at least one memory comprising instructions; and at least one processor coupled to the at least one memory and configured to: receive a first key identifier from a user device; transmit the first key identifier to an authentication server function; receive, from the authentication server function, a first enhanced application key and an indication that the user device is using an enhanced key identifier; transmit, to the user device, a response, the response including a request for an updated key identifier; receive a second key identifier from the user device; transmit the second key identifier to an authentication server function; receive, from the authentication server function, a second enhanced application key; and communicate with the user device based on the second enhanced application key.

Aspect 19. A method for wireless communications, comprising: generating an anchor key based on a key from an authentication server function; associating a count value with the anchor key; generating an enhanced key identifier based on the count value; and transmitting the enhanced key identifier to a remote application.

Aspect 20. The method of aspect 19, further comprising: receiving an indication, from the remote application, to refresh the enhanced key identifier; incrementing the count value; generating a refreshed enhanced key identifier based on the incremented count value; and transmitting the refreshed enhanced key identifier to the remote application.

Aspect 21. The method of any of aspects 19-21, wherein the enhanced key identifier is generated based on an encrypted count value.

Aspect 22. The method of aspect 21, further comprising generating the encrypted count value based on the count value and results from a first function.

Aspect 23. The method of aspect 22, wherein the results from the first function are based on a first key derived from the anchor key.

Aspect 24. The method of aspect 21, wherein the enhanced key identifier is further generated based on a message authentication code.

Aspect 25. The method of aspect 24, wherein the message authentication code is generated based on a second key derived from the anchor key.

Aspect 26. The method of any of aspects 19-26, further comprising using the enhanced key identifier based on an indication stored in at least one of a memory or a universal subscriber identity module.

Aspect 27. The method of any of aspects 19-26, further comprising generating an application key for use with the remote application based on the anchor key and the count value.

Aspect 28. A method for wireless communications, comprising: receiving an anchor key and key identifier associated with a user device from an authentication server function; receiving a first request for an application key from a remote application, the first request including a first key identifier; determining that the first key identifier is a first enhanced key identifier, wherein the first enhanced key identifier includes a count value; generating a first enhanced application key based on the count value associated with the first enhanced key identifier; and transmitting the first enhanced application key and an indication that the user device is using an enhanced key identifier to the remote application.

Aspect 29. The method of aspect 28, further comprising: receiving a second request for an application key from a remote application, the second request including a second key identifier; determining that the second key identifier is a second enhanced key identifier; generating a second enhanced application key based on the count value associated with the second enhanced key identifier; and transmitting the second enhanced application key to the remote application.

Aspect 30. The method of any of aspects 28-29, wherein the count value associated with the first enhanced key identifier comprises an encrypted count value.

Aspect 31. The method of aspect 30, wherein the anchor key is associated with an initial count value, and further comprising decrypting the encrypted count value based on the initial count value and results from a first function.

Aspect 32. The method of aspect 31, wherein the results from the first function are based on a first key derived from the anchor key.

Aspect 33. The method of aspect 30, wherein the enhanced key identifier is further generated based on a message authentication code.

Aspect 34. The method of aspect 33, wherein the message authentication code is generated based on a second key derived from the anchor key.

Aspect 35. The method of any of aspects 28-34, further comprising generating the first enhanced application key for use with the remote application based on the anchor key and the count value.

Aspect 36. A method for wireless communications, comprising: receiving a first key identifier from a user device; transmitting the first key identifier to an authentication server function; receiving, from the authentication server function, a first enhanced application key and an indication that the user device is using an enhanced key identifier; transmitting, to the user device, a response, the response including a request for an updated key identifier; receiving a second key identifier from the user device; transmitting the second key identifier to an authentication server function; receiving, from the authentication server function, a second enhanced application key; and communicating with the user device based on the second enhanced application key.

Aspect 37. A non-transitory computer-readable medium having stored thereon instructions that, when executed by at least one processor, cause the at least one processor to: generate an anchor key based on a key from an authentication server function; associate a count value with the anchor key; generate an enhanced key identifier based on the count value; and transmit the enhanced key identifier to a remote application.

Aspect 38. The non-transitory computer-readable medium of aspect 37, wherein the instructions further cause the at least one processor to: receive an indication, from the remote application, to refresh the enhanced key identifier; increment the count value; generate a refreshed enhanced key identifier based on the incremented count value; and transmit the refreshed enhanced key identifier to the remote application.

Aspect 39. The non-transitory computer-readable medium of any of aspects 37-38, wherein the enhanced key identifier is generated based on an encrypted count value.

Aspect 40. The non-transitory computer-readable medium of aspect 39, wherein the instructions further cause the at least one processor to generate the encrypted count value based on the count value and results from a first function.

Aspect 41. The non-transitory computer-readable medium of aspect 40, wherein the results from the first function are based on a first key derived from the anchor key.

Aspect 42. The non-transitory computer-readable medium of aspect 39, wherein the enhanced key identifier is further generated based on a message authentication code.

Aspect 43. The non-transitory computer-readable medium of aspect 42, wherein the message authentication code is generated based on a second key derived from the anchor key.

Aspect 44. The non-transitory computer-readable medium of any of aspects 37-43, wherein the instructions further cause the at least one processor to determine to use the enhanced key identifier based on an indication stored in at least one of a memory or a universal subscriber identity module.

Aspect 45. The non-transitory computer-readable medium of any of aspects 37-44, wherein the instructions further cause the at least one processor to generate an application key for use with the remote application based on the anchor key and the count value.

Aspect 46. A non-transitory computer-readable medium having stored thereon instructions that, when executed by at least one processor, cause the at least one processor to: receive an anchor key and key identifier associated with a user device from an authentication server function; receive a first request for an application key from a remote application, the first request including a first key identifier; determine that the first key identifier is a first enhanced key identifier, wherein the first enhanced key identifier includes a count value; generate a first enhanced application key based on the count value associated with the first enhanced key identifier; and transmit the first enhanced application key and an indication that the user device is using an enhanced key identifier to the remote application.

Aspect 47. The non-transitory computer-readable medium of aspect 46, wherein the instructions further cause the at least one processor to: receive a second request for an application key from a remote application, the second request including a second key identifier; determine that the second key identifier is a second enhanced key identifier; generate a second enhanced application key based on the count value associated with the second enhanced key identifier; and transmit the second enhanced application key to the remote application.

Aspect 48. The non-transitory computer-readable medium of any of aspects 46-47, wherein the count value associated with the first enhanced key identifier comprises an encrypted count value.

Aspect 49. The non-transitory computer-readable medium of aspect 48, wherein the anchor key is associated with an initial count value, and wherein the instructions further cause the at least one processor to decrypt the encrypted count value based on the initial count value and results from a first function.

Aspect 50. The non-transitory computer-readable medium of aspect 49, wherein the results from the first function are based on a first key derived from the anchor key.

Aspect 51. The non-transitory computer-readable medium of aspect 48, wherein the enhanced key identifier is further generated based on a message authentication code.

Aspect 52. The non-transitory computer-readable medium of aspect 51, wherein the message authentication code is generated based on a second key derived from the anchor key.

Aspect 53. The non-transitory computer-readable medium of any of aspects 46-52, wherein the instructions further cause the at least one processor to generate the first enhanced application key for use with the remote application based on the anchor key and the count value.

Aspect 54. A non-transitory computer-readable medium having stored thereon instructions that, when executed by at least one processor, cause the at least one processor to: at least one memory comprising instructions; and at least one processor coupled to the at least one memory and configured to: receive a first key identifier from a user device; transmit the first key identifier to an authentication server function; receive, from the authentication server function, a first enhanced application key and an indication that the user device is using an enhanced key identifier; transmit, to the user device, a response, the response including a request for an updated key identifier; receive a second key identifier from the user device; transmit the second key identifier to an authentication server function; receive, from the authentication server function, a second enhanced application key; and communicate with the user device based on the second enhanced application key.

Aspect 55. An apparatus comprising means for performing a method according to any of Aspects 18 to 36.

Aspect 61. An apparatus for wireless communications, comprising: at least one memory comprising instructions; and at least one processor coupled to the at least one memory and configured to: generate an anchor key based on an authentication server function key; associate a count value with the anchor key; generate a temporary device identifier based on the authentication server function key; generate an enhanced key identifier based on the count value, wherein the enhanced key identifier includes a portion of the temporary device identifier, wherein the portion of the temporary device identifier is less in size than an entire temporary device identifier; and transmit the enhanced key identifier to a remote application.

Aspect 62. The apparatus of Aspect 61, wherein the enhanced key identifier includes an encrypted count value.

Aspect 63. The apparatus of Aspect 62, wherein the at least one processor is further configured to generate the encrypted count value based on the count value and results from a first function.

Aspect 64. The apparatus of Aspect 63, wherein the results from the first function are based on a first key derived from the anchor key.

Aspect 65. The apparatus of Aspect 64, wherein the enhanced key identifier is further generated based on a message authentication code.

Aspect 66. The apparatus of Aspect 65, wherein the message authentication code is generated based on a second key derived from the anchor key.

Aspect 67. The apparatus of Aspect 66, wherein the message authentication code is further generated based on at least one of the portion of the temporary device identifier or an identifier of a remote application.

Aspect 68. The apparatus of any of Aspects 61-67, wherein the portion of the temporary device identifier comprises a first 128 bits of the temporary device identifier.

Aspect 69. The apparatus of any of Aspects 61-68, wherein the at least one processor is further configured to: receive an indication, from the remote application, to refresh the enhanced key identifier; increment the count value based on the received indication; generate a refreshed enhanced key identifier based on the incremented count value; and transmit the refreshed enhanced key identifier to the remote application.

Aspect 70. The apparatus of any of Aspects 61-69, wherein the at least one processor is configured to determine to use the enhanced key identifier based on an indication stored in at least one of the memory or a universal subscriber identity module.

Aspect 71. The apparatus of any of Aspects 61-70, wherein the at least one processor is further configured to generate an application key for use with the remote application based on the anchor key and the count value.

Aspect 72. A method for wireless communications, comprising: generating an anchor key based on an authentication server function key; associating a count value with the anchor key; generating a temporary device identifier based on the authentication server function key; generating an enhanced key identifier based on the count value, wherein the enhanced key identifier includes a portion of the temporary device identifier, wherein the portion of the temporary device identifier is less in size than an entire temporary device identifier; and transmitting the enhanced key identifier to a remote application.

Aspect 73. The method of Aspect 72, wherein the enhanced key identifier includes an encrypted count value.

Aspect 74. The method of Aspect 73, further comprising generating the encrypted count value based on the count value and results from a first function.

Aspect 75. The method of Aspect 74, wherein the results from the first function are based on a first key derived from the anchor key.

Aspect 76. The method of Aspect 75, wherein the enhanced key identifier is further generated based on a message authentication code.

Aspect 77. The method of Aspect 76, wherein the message authentication code is generated based on a second key derived from the anchor key.

Aspect 78. The method of Aspect 77, wherein the message authentication code is further generated based on at least one of the portion of the temporary device identifier or an identifier of a remote application.

Aspect 79. The method of any of Aspects 72-77, wherein the portion of the temporary device identifier comprises a first 128 bits of the temporary device identifier.

Aspect 80. The method of any of Aspects 72-79, further comprising: receiving an indication, from the remote application, to refresh the enhanced key identifier; incrementing the count value based on the received indication; generating a refreshed enhanced key identifier based on the incremented count value; and transmitting the refreshed enhanced key identifier to the remote application.

Aspect 81. The method of any of Aspects 72-80, further comprising determining to use the enhanced key identifier based on an indication stored in a memory or a universal subscriber identity module.

Aspect 82. The method of any of Aspects 72-81, further comprising generating an application key for use with the remote application based on the anchor key and the count value.

Aspect 83. A non-transitory computer-readable medium having stored thereon instructions that, when executed by at least one processor, cause the at least one processor to: generate an anchor key based on an authentication server function key; associate a count value with the anchor key; generate a temporary device identifier based on the authentication server function key; generate an enhanced key identifier based on the count value, wherein the enhanced key identifier includes a portion of the temporary device identifier, wherein the portion of the temporary device identifier is less in size than an entire temporary device identifier; and transmit the enhanced key identifier to a remote application.

Aspect 84. The non-transitory computer-readable medium of Aspect 83, wherein the enhanced key identifier includes an encrypted count value.

Aspect 85. The non-transitory computer-readable medium of Aspect 84, wherein the at least one processor is further configured to generate the encrypted count value based on the count value and results from a first function.

Aspect 86. The non-transitory computer-readable medium of Aspect 85, wherein the results from the first function are based on a first key derived from the anchor key.

Aspect 87. The non-transitory computer-readable medium of Aspect 86, wherein the enhanced key identifier is further generated based on a message authentication code.

Aspect 88. The non-transitory computer-readable medium of Aspect 87, wherein the message authentication code is generated based on a second key derived from the anchor key.

Aspect 89. The non-transitory computer-readable medium of Aspect 88, wherein the message authentication code is further generated based on at least one of the portion of the temporary device identifier or an identifier of a remote application.

Aspect 90. The non-transitory computer-readable medium of any of Aspects 83-89, wherein the portion of the temporary device identifier comprises a first 128 bits of the temporary device identifier.

Aspect 91. The non-transitory computer-readable medium of any of Aspects 83-90, wherein the at least one processor is further configured to: receive an indication, from the remote application, to refresh the enhanced key identifier; increment the count value based on the received indication; generate a refreshed enhanced key identifier based on the incremented count value; and transmit the refreshed enhanced key identifier to the remote application.

Aspect 92. The non-transitory computer-readable medium of any of Aspects 83-91, wherein the at least one processor is configured to determine to use the enhanced key identifier based on an indication stored in a memory or a universal subscriber identity module.

Aspect 93. The non-transitory computer-readable medium of any of Aspects 83-92, wherein the at least one processor is further configured to generate an application key for use with the remote application based on the anchor key and the count value.

Aspect 94. An apparatus comprising means for performing a method according to any of Aspects 72-82.

What is claimed is:

1. An apparatus for wireless communications, comprising:
   at least one memory comprising instructions; and
   at least one processor coupled to the at least one memory and configured to:
      generate an anchor key based on an authentication server function key;
      associate a count value with the anchor key;
      generate a temporary device identifier based on the authentication server function key;

generate an enhanced key identifier based on the count value, wherein the enhanced key identifier includes a portion of the temporary device identifier, wherein the portion of the temporary device identifier is less in size than an entire temporary device identifier; and transmit the enhanced key identifier to a remote application.

2. The apparatus of claim 1, wherein the enhanced key identifier includes an encrypted count value.

3. The apparatus of claim 2, wherein the at least one processor is further configured to generate the encrypted count value based on the count value and results from a first function.

4. The apparatus of claim 3, wherein the results from the first function are based on a first key derived from the anchor key.

5. The apparatus of claim 4, wherein the enhanced key identifier is further generated based on a message authentication code.

6. The apparatus of claim 5, wherein the message authentication code is generated based on a second key derived from the anchor key.

7. The apparatus of claim 6, wherein the message authentication code is further generated based on at least one of the portion of the temporary device identifier or an identifier of a remote application.

8. The apparatus of claim 1, wherein the portion of the temporary device identifier comprises a first 128 bits of the temporary device identifier.

9. The apparatus of claim 1, wherein the at least one processor is further configured to:
receive an indication, from the remote application, to refresh the enhanced key identifier;
increment the count value based on the received indication;
generate a refreshed enhanced key identifier based on the incremented count value; and
transmit the refreshed enhanced key identifier to the remote application.

10. The apparatus of claim 1, wherein the at least one processor is configured to determine to use the enhanced key identifier based on an indication stored in at least one of the memory or a universal subscriber identity module.

11. The apparatus of claim 1, wherein the at least one processor is further configured to generate an application key for use with the remote application based on the anchor key and the count value.

12. A method for wireless communications, comprising:
generating an anchor key based on an authentication server function key;
associating a count value with the anchor key;
generating a temporary device identifier based on the authentication server function key;
generating an enhanced key identifier based on the count value, wherein the enhanced key identifier includes a portion of the temporary device identifier, wherein the portion of the temporary device identifier is less in size than an entire temporary device identifier; and
transmitting the enhanced key identifier to a remote application.

13. The method of claim 12, wherein the enhanced key identifier includes an encrypted count value.

14. The method of claim 13, further comprising generating the encrypted count value based on the count value and results from a first function.

15. The method of claim 14, wherein the results from the first function are based on a first key derived from the anchor key.

16. The method of claim 15, wherein the enhanced key identifier is further generated based on a message authentication code.

17. The method of claim 16, wherein the message authentication code is generated based on a second key derived from the anchor key.

18. The method of claim 17, wherein the message authentication code is further generated based on at least one of the portion of the temporary device identifier or an identifier of a remote application.

19. The method of claim 12, wherein the portion of the temporary device identifier comprises a first 128 bits of the temporary device identifier.

20. The method of claim 12, further comprising:
receiving an indication, from the remote application, to refresh the enhanced key identifier;
incrementing the count value based on the received indication;
generating a refreshed enhanced key identifier based on the incremented count value; and
transmitting the refreshed enhanced key identifier to the remote application.

21. The method of claim 12, further comprising determining to use the enhanced key identifier based on an indication stored in a memory or a universal subscriber identity module.

22. The method of claim 12, further comprising generating an application key for use with the remote application based on the anchor key and the count value.

23. A non-transitory computer-readable medium having stored thereon instructions that, when executed by at least one processor, cause the at least one processor to:
generate an anchor key based on an authentication server function key;
associate a count value with the anchor key;
generate a temporary device identifier based on the authentication server function key;
generate an enhanced key identifier based on the count value, wherein the enhanced key identifier includes a portion of the temporary device identifier, wherein the portion of the temporary device identifier is less in size than an entire temporary device identifier; and
transmit the enhanced key identifier to a remote application.

24. The non-transitory computer-readable medium of claim 23, wherein the enhanced key identifier includes an encrypted count value.

25. The non-transitory computer-readable medium of claim 24, wherein the at least one processor is further configured to generate the encrypted count value based on the count value and results from a first function.

26. The non-transitory computer-readable medium of claim 25, wherein the results from the first function are based on a first key derived from the anchor key.

27. The non-transitory computer-readable medium of claim 26, wherein the enhanced key identifier is further generated based on a message authentication code.

28. The non-transitory computer-readable medium of claim 27, wherein the message authentication code is generated based on a second key derived from the anchor key.

29. The non-transitory computer-readable medium of claim 28, wherein the message authentication code is further generated based on at least one of the portion of the temporary device identifier or an identifier of a remote application.

30. The non-transitory computer-readable medium of claim 23, wherein the portion of the temporary device identifier comprises a first 128 bits of the temporary device identifier.

* * * * *